Dec. 11, 1951  J. C. CREAGMILE  2,577,841
WHEEL ALIGNMENT GAUGE
Filed April 4, 1946  2 SHEETS—SHEET 1
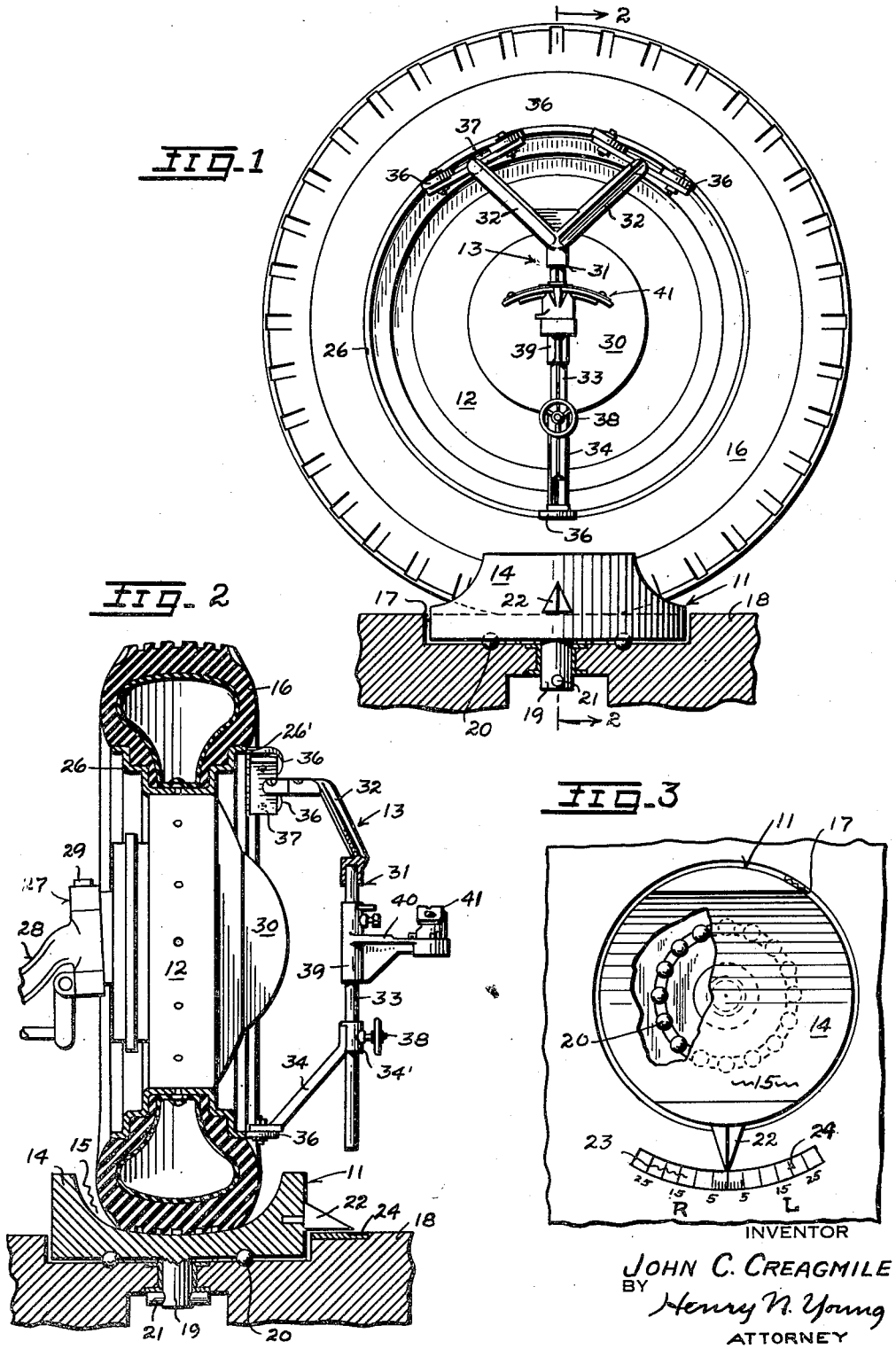
INVENTOR
JOHN C. CREAGMILE
BY Henry N. Young
ATTORNEY Dec. 11, 1951   J. C. CREAGMILE   2,577,841
WHEEL ALIGNMENT GAUGE
Filed April 4, 1946   2 SHEETS—SHEET 2
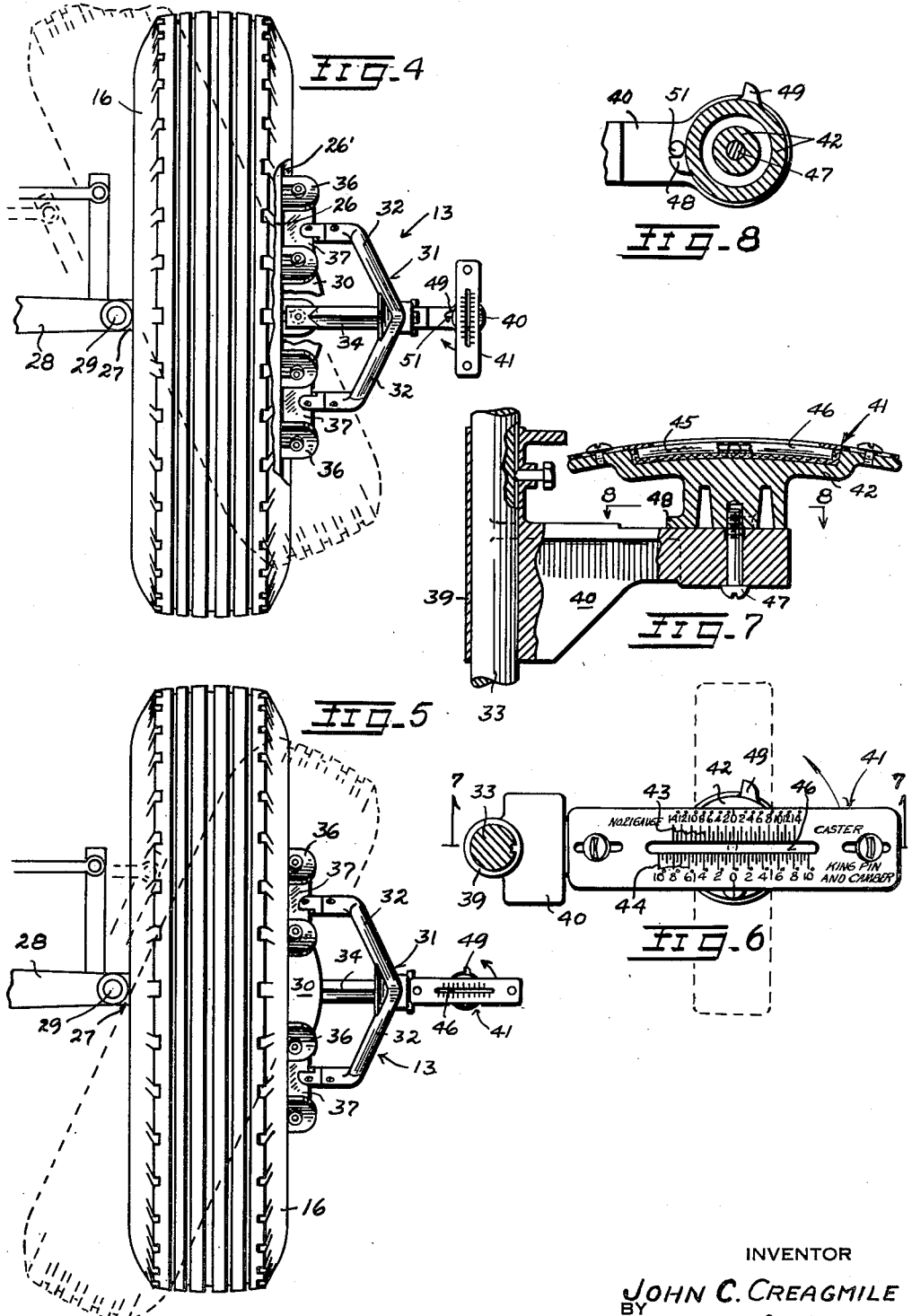
INVENTOR
JOHN C. CREAGMILE
BY
Henry N. Young
ATTORNEY Patented Dec. 11, 1951

2,577,841

UNITED STATES PATENT OFFICE 2,577,841

WHEEL ALIGNMENT GAUGE

John C. Creagmile, Walnut Creek, Calif.

Application April 4, 1946, Serial No. 659,601

3 Claims. (Cl. 33—203.18)

The invention relates to a means for gauging various alignment relations of dirigible support wheels of vehicles.

The general object of the invention is to provide an improved and particularly simple apparatus for gauging such features as the camber, caster, toe-in, and turning radius of the dirigible wheels of vehicles while the wheels support the vehicles.

A more specific object is to provide an apparatus of the character described which requires the provision of a minimum of fixed equipment for its use.

A further object is to provide a wheel-carried unit of the apparatus which may be attached and used without requiring the removal of hub caps or other wheel parts.

The invention possesses other objects and features of advantage, some of which, with the foregoing, will be set forth or be apparent in the following description of a typical embodiment of the invention, and in the accompanying drawings, in which, Figure 1 is an outside face view of a vehicle wheel supported on a turntable for measuring turn angles of the wheel, and carrying an angle-measuring unit of the apparatus.

Figure 2 is a sectional view taken at the line 2—2 in Figure 1.

Figure 3 is a plan view of the turntable assembly.

Figures 4 and 5 are plan views showing the wheel-mounted unit supported on a wheel and having an angle-measuring element thereof disposed for the taking of readings respecting different alignment relations for the wheel.

Figure 6 is an enlarged plan view of the portion of the wheel-carried unit which includes the angle-measuring device as disposed in Figure 5.

Figure 7 is a section at the line 7—7 in Figure 6.

Figure 8 is a fragmentary sectional view at the line 8—8 in Figure 7.

Essentially, the present wheel aligner of my invention includes appropriately spaced turntables 11 which are arranged to simultaneously support a pair of cooperative dirigible support wheels 12 of a vehicle; only one turntable 11 and supported wheel 12 are presently shown. The apparatus further, and solely, comprises angle-measuring units 13 for removable mounting on the wheels 12 in a manner which does not require the removal of any wheel part or the provision of a special wheel structure.

A turntable 11 comprises a disc 14 provided with a trough 15 diametrically across its top for complementarily receiving the tread portion of a tire 16 on a wheel 12. The bottom portion of the disc 14 extends into a depression 17 provided in a supporting floor 18, the bottom of the depression 17 preferably lying in the top plane of the floor. A stem 19 depends axially from the disc 14 into a complementary opening or socket in the floor for centering the disc in the depression 17, and ball bearings 20 are operative between the disc and the depression bottom in opposed raceways to provide an anti-friction support of the disc from the floor. As particularly shown, the stem-receiving floor opening is undercut to provide for the mounting of a pin 21 diametrically through the stem to extend therefrom for retaining the disc in the depression. A pointer 22 extends radially from the disc and laterally of its trough 15 above the floor surface for reference to an angle scale 23 provided by a plate member 24 which is countersunk in the floor. The arrangement is such that a dirigible vehicle wheel supported upon a turntable 11 may have its turn angle measured with respect to its straight ahead disposition.

The tire 16 is mounted on a usual rim 26 of ferrous composition, and said rim is in turn mounted on a wheel 12 which revolves about a spindle assembly 27 hinged to the vehicle axle 28 at a king pin 29. A suitable hub cap 30 encloses and conceals the wheel hub and spindle end at the outer side of the wheel. The gauging unit 13 comprises a generally Y-shaped support body or bracket 31 having arms 32 and a stem or leg 33 unitarily associated in mutually fixed relation. The arms 32 extend obliquely from the line of the leg 33, and an arm 34 is mounted on the leg 33 for adjusted positioning therealong; the leg-engaging end of the present arm 34 comprises a sleeve 34' non-rotatively receiving the leg 33 from which the arm extends obliquely to the same side of the leg as do the arms 32.

The free ends of the arms 32 and 34 define a plane which is parallel to the line of the leg 33 and are arranged for attachment to a wheel rim 26 as a mounting means for the bracket assembly. A preferred and particularly simple means for detachably mounting the bracket 31 on the wheel rim comprises the provision of magnets at the free arm ends for simultaneous magnetic adhesion to the rim; as particularly shown, permanent horseshoe magnets 36 are utilized as a bracket-attaching means. In the present structure, magnets 36 are fixed in pairs at the ends of bar members 37 which are in turn intermediately hinged to the ends of the bracket arms 32, and a single magnet 36 is mounted on the extremity of the arm 34. The pole-faces of the magnet assembly of the bracket are mutually coplanar and are arranged to simultaneously engage the outer edge 26' of a rim 26 for a magnetic mounting of the bracket on the rim, it being noted that the permitted adjustment of the arm 34 along the leg 33 provides for a fitting of the magnet assembly to rims of different sizes; a set-screw 38 is provided on the sleeve 34' for securing the sleeve and its arm 34 in adjusted position on the leg 33. The mounted bracket 31 is arranged to be used with its leg portion 33 in upright position and with the arm 34 lowermost, it being noted that the leg is spaced outwardly of a hub cap 30 of the wheel which mounts the bracket; since the weight of the bracket and the angle-measuring assembly mounted thereon tends to pull the bracket outwardly from the rim at its top and press it against the rim at its bottom, the provision of four magnets at the bracket top is generally preferable for assuring and maintaining the magnetic mounting of the bracket on the rim.

Between the sleeve 34' and its top, the leg 33 slidably mounts a sleeve 39 comprising part of a member 40 which extends radially from the sleeve and provides the support for an inclination-measuring spirit level unit 41 carried by a base 42 which provides scales 43 and 44 at opposite sides of the bubble cavity 45 therein, said scales being arranged for use by reference to the level bubble for indicating the inclination of the level from an intermediate "level" position of the curved bubble glass 46. The level base 42 is mounted upon the outer end of the member 40 for an adjustment about an axis which is parallel to the axis of the leg 33 and is therefore parallel to the plane of the wheel which mounts the unit 13 and is perpendicular to the leveling (longitudinal) line of the level glass. As particularly shown, opposed upper and lower faces of the arm member 40 and the base 42 are mutually and slidably engaged in a plane which is perpendicular to the axis of the leg 33, and a pivot bolt 47 extends rotatably through the arm end to threadedly engage the base for a swivel mounting of the level assembly upon the top of the arm for its rotative adjustment about the before-mentioned axis which is parallel to the leg 33.

Mutually spaced ears 48 and 49 extend radially from the base 42 at its bottom for selective engagement with a pin 51 extending upwardly from the arm 40, said ears being so positioned with respect to the leveling line of the level glass that the latter is disposable in either parallel relation to the plane of support of the bracket (Fig. 4), or perpendicular to said plane (Fig. 5); said level glass positions are limiting positions for the level glass, whereby the level glass is held to a ninety degree range of adjustment about its swivel axis between said limiting positions in which it is used, and is frictionally held in either position.

The unit 13 is arranged to be mounted on the outer side of a wheel 12 supported on a turntable 11 to dispose the bracket leg 33 in a vertical plane through the bearing point of a wheel on the turntable; the latter is accomplished by disposing the level 41 in the fore-and-aft position shown for it in Figs. 1 and 2 and 4 whereby the assembly may be rotatively adjusted about the wheel axis to register the level bubble with the central zero points of the scales 43 and 44, the assembly being rotated about the rim, or the wheel being rotated, for effecting any required adjustment. The level assembly is preferably adjusted along the stem 23 to dispose it generally opposite the center of the hub cap 30, as is indicated in Figs. 1 and 2.

Having the unit 13 mounted on the wheel rim and positioned as shown and described, the gauging of king-pin inclination and of caster may be effected by swinging the wheel on and with the turntable between limiting right-turn and left-turn positions thereof, such changed positioning of the wheel from its initial straight-ahead positions affecting the reading of the level bubble with respect to the scales 43 and 44 by reason of the caster and camber of the king pin, and their variations from the zero scale points indicating the caster angle on the scale 43 and the king pin inclination on the scale 44, it being noted that the angle calibrations of the scale 43 are shorter than those of the scale 44.

Noting that the swing of the wheel axis (spindle) is in an oblique plane because of the combination of the caster (fore-and-aft) and camber (lateral) angles of the king pin from the vertical, and changes the level bubble position as the wheel is swung in either direction from its straight-ahead position, it is necessary that the readings for the level bubble be for definite turn angles of the wheel. The present apparatus has, accordingly, been designed to provide its gauging indications of caster and king pin inclination in terms of a fifty degree turning of the wheel between its left-turn and right-turn positions for gauging; as particularly shown, the turntable scale 23 represents a total turn angle of fifty degrees, or twenty-five degrees each way from a zero setting when the wheel is in straight-ahead position. Noting that the calibrations of the scale 44 represent true angle values for a king pin with respect to the vertical, the scale 43, in order to provide the corresponding solely fore-and-aft inclination (caster) of the king pin are closer together than the calibrations of the scale 44 in order to measure the caster angle per se.

The camber angle of the wheel 12 may be read directly on the scale 44 by positioning the same as in Figs. 5 to 7 while the wheel is in straight-ahead position, and reading the scale without any turning of the wheel. The toe-in of a cooperative pair of front wheels 12 may be measured directly by a reading of the setting of the turntable supporting one wheel while the other wheel is set in straight-ahead position. The turning radius of a vehicle may be ascertained by measuring the difference in the turn angles of the different cooperative wheels when one of the wheels is turned through a predetermined angle from its straight-ahead setting, it being noted that the wheels toe-out when turned beyond a certain relatively small turn angle.

From the foregoing description of my invention, taken in connection with the accompanying drawings, the advantages of the construction and use of the present alignment gauging device will be readily understood by those skilled in the art to which the invention appertains. While I have described the features and use of an arrangement which I now consider to be a preferred embodiment of my invention, I desire to have it understood that the showing is primarily illustrative, and that such changes may be made, when desired, as fall within the scope of the following claims.

I claim:

1. For gauging the alignment relations of a dirigible wheel, a wheel gauging unit comprising a calibrated arcuate spirit-level gauge, a gauge-carrying bracket having an arm portion and a sleeve portion, said arm portion extending radially from a said sleeve portion and having the gauge swivelled to the arm portion for its rotative adjustment about an axis radial to the arc of the level and extending through the zero point of the gauge and laterally spaced from the axis of the sleeve in parallel relation thereto, a support rod engaged through the bore of the sleeve for a fixed adjusted disposal of the bracket along it, and means for directly mounting said support rod on the wheel in parallel relation to the wheel plane whereby to directly utilize the wheel-mounted gauge to measure the angularity of said axis with respect to the vertical.

2. A structure in accordance with claim 1 having a stop means directly cooperative between the gauge and the bracket arm to confine the adjustment of the gauge about its swivel axis to limiting positions in which the gauge is parallel or perpendicular to the plane of the supporting wheel.

3. For gauging the alignment relations of a dirigible wheel, a wheel gauging unit comprising a calibrated arcuate spirit-level gauge, a gauge-supporting bracket having an arm portion and a sleeve portion, said arm portion extending radially from said sleeve portion and having the gauge swivelled thereto for its rotative adjustment about an axis radial to the arc of the level and laterally spaced from the axis of the sleeve in parallel relation thereto, a support rod engaged through the bore of the sleeve for a sliding adjustment of the bracket along it, means for direct engagement with the wheel for mounting said support rod thereon in parallel relation to the wheel plane and in intersecting relation to the wheel axis, and means for fixing the bracket to the mounted support rod to dispose the zero point of the gauge substantially in the axial line of the wheel.

JOHN C. CREAGMILE.

REFERENCES CITED

The following references are of record in the file of this patent:

UNITED STATES PATENTS

| Number | Name | Date |
|---|---|---|
| 521,306 | Campbell | June 12, 1894 |
| 1,616,686 | Fray | Feb. 8, 1927 |
| 1,653,249 | Bennett | Dec. 20, 1927 |
| 1,712,889 | Knox | May 14, 1929 |
| 1,971,702 | Burgan | Aug. 28, 1934 |
| 2,115,347 | Sutton | Apr. 26, 1938 |
| 2,167,361 | Haucke | July 25, 1939 |
| 2,197,468 | Graham | Apr. 16, 1940 |
| 2,266,224 | MacMillan | Dec. 16, 1941 |
| 2,285,965 | Halstead | June 9, 1942 |
| 2,292,969 | Peters | Aug. 11, 1942 |
| 2,346,360 | Creagmile | Apr. 11, 1944 |
| 2,475,502 | Holmes | July 5, 1949 |

FOREIGN PATENTS

| Number | Country | Date |
|---|---|---|
| 20,928 | Great Britain | 1907 |